United States Patent
Kamasamudram et al.

(10) Patent No.: US 9,517,457 B2
(45) Date of Patent: Dec. 13, 2016

(54) AFTERTREATMENT SYSTEMS WITH REDUCED $N_2O$ GENERATION

(71) Applicant: Cummins Inc., Columbus, IN (US)

(72) Inventors: Krishna Kamasamudram, Columbus, IN (US); Neal W. Currier, Columbus, IN (US); Ashok Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 53 days.

(21) Appl. No.: 14/067,814

(22) Filed: Oct. 30, 2013

(65) Prior Publication Data
US 2015/0113966 A1 Apr. 30, 2015

(51) Int. Cl.
| | |
|---|---|
| *F01N 3/00* | (2006.01) |
| *B01J 29/78* | (2006.01) |
| *B01D 53/94* | (2006.01) |
| *B01J 29/72* | (2006.01) |
| *F01N 3/10* | (2006.01) |
| *F01N 3/20* | (2006.01) |
| *F01N 13/00* | (2010.01) |

(52) U.S. Cl.
CPC ............ *B01J 29/78* (2013.01); *B01D 53/9409* (2013.01); *B01D 53/9431* (2013.01); *B01J 29/72* (2013.01); *F01N 3/106* (2013.01); *F01N 3/2066* (2013.01); *F01N 13/009* (2014.06); *F01N 13/0093* (2014.06); *B01D 2251/206* (2013.01); *B01D 2255/20723* (2013.01); *B01D 2255/20738* (2013.01); *B01D 2255/20761* (2013.01); *B01D 2255/50* (2013.01); *B01D 2255/9032* (2013.01); *B01D 2258/012* (2013.01); *F01N 2510/0682* (2013.01); *F01N 2570/145* (2013.01); *F01N 2900/1404* (2013.01); *Y02C 20/10* (2013.01); *Y02T 10/24* (2013.01)

(58) Field of Classification Search
CPC ................................................. F01N 2510/0682
USPC ............................................................ 60/299
See application file for complete search history.

(56) References Cited

U.S. PATENT DOCUMENTS

| | | |
|---|---|---|
| 5,024,981 A | 6/1991 | Speronello et al. |
| 6,872,372 B1 | 3/2005 | Verhaak |
| 6,890,501 B2 | 5/2005 | Delahay |
| 7,393,512 B2 | 7/2008 | Schwefer et al. |
| 7,438,878 B2 | 10/2008 | Chen et al. |

(Continued)

FOREIGN PATENT DOCUMENTS

| | | |
|---|---|---|
| CA | 2664401 | 3/2008 |
| CN | 101259377 | 9/2008 |

(Continued)

*Primary Examiner* — Kenneth Bomberg
*Assistant Examiner* — Anthony Ayala Delgado
(74) *Attorney, Agent, or Firm* — Taft, Stettinius & Hollister LLP

(57) ABSTRACT

Systems, apparatus and methods are disclosed for reducing the amount of nitrous oxide ($N_2O$) produced in a selective catalytic reductant (SCR) catalyst in an exhaust aftertreatment system. The SCR catalysts are arranged to reduce the amount of $N_2O$ produced during $NO_x$ reduction while not adversely affecting $NO_x$ conversion.

20 Claims, 4 Drawing Sheets

(56) References Cited

U.S. PATENT DOCUMENTS

| | | |
|---|---|---|
| 7,462,340 B2 | 12/2008 | Schwefer et al. |
| 7,485,276 B2 | 2/2009 | Schwefer et al. |
| 7,521,031 B2 | 4/2009 | Okubo et al. |
| 7,744,839 B2 | 6/2010 | Schwefer et al. |
| 7,891,171 B2 | 2/2011 | Cho et al. |
| 7,943,548 B2 | 5/2011 | Castellano et al. |
| 7,951,742 B2 | 5/2011 | Chen |
| 7,976,804 B2 | 7/2011 | Jantsch |
| 8,132,403 B2 | 3/2012 | Toshioka et al. |
| 8,240,132 B2 | 8/2012 | Gandhi et al. |
| 8,407,987 B2 | 4/2013 | Andersson et al. |
| 8,544,260 B2 * | 10/2013 | Boorse et al. .................. 60/299 |
| 9,017,626 B2 * | 4/2015 | Tang et al. ................ 423/213.2 |
| 2007/0071657 A1 | 3/2007 | Okubo |
| 2008/0070778 A1 | 3/2008 | Castellano |
| 2008/0127634 A1 | 6/2008 | Cho et al. |
| 2011/0085954 A1 | 4/2011 | Doring |
| 2011/0146237 A1 | 6/2011 | Adelmann |
| 2011/0203260 A1 | 8/2011 | Umemoto et al. |
| 2012/0275977 A1 | 11/2012 | Chandler |
| 2014/0271426 A1 * | 9/2014 | Casci ................ B01D 53/9418 423/213.2 |

FOREIGN PATENT DOCUMENTS

| | | |
|---|---|---|
| EP | 0935055 | 1/2006 |
| EP | 1944075 | 7/2008 |
| EP | 1683565 | 9/2011 |
| EP | 1918016 | 3/2012 |
| EP | 2438985 | 11/2012 |
| JP | 2010112290 | 5/2010 |
| WO | 2008036803 | 3/2008 |

* cited by examiner

AFTERTREATMENT SYSTEMS WITH REDUCED $N_2O$ GENERATION

BACKGROUND

The present application generally relates to exhaust aftertreatment systems of internal combustion engine diesel exhaust systems, and more particularly to exhaust aftertreatment systems that include a selective catalytic reduction (SCR) catalyst to control exhaust system emissions. Exhaust aftertreatment systems typically include one or more exhaust treatment catalyst elements, including diesel oxidation catalysts (DOC), diesel particulate filters (DPF), SCR catalysts, and ammonia slip catalysts (ASC).

The aforementioned exhaust treatment catalyst elements can be a source for nitrous oxide ($N_2O$) as a byproduct of $NO_x$ reduction and $NH_3$ oxidation processes. Modern exhaust aftertreatment systems are being required to limit emissions based on global warming potential (GWP). Even small quantities of $N_2O$ can impact that ability to meet $CO_2$ based fuel economy standards since the GWP conversion of $N_2O$ to $CO_2$ is 298 grams of $CO_2$ for every gram of $N_2O$, impacting fuel economy based on $CO_2$ counting. As a result, the ability to implement aftertreatment technologies that provide high fuel efficiencies with high engine-out $NO_x$ architectures may be limited due to the increased production of $N_2O$ at high engine-out $NO_x$ amounts. In addition, catalyst technologies that are highly effective in treating $NO_x$ with ammonia as a reductant may be limited due to the production of $N_2O$ during $NO_x$ reduction. Therefore, a need remains for further improvements in exhaust aftertreatment systems to reduce the emission of $N_2O$ into the exhaust environment.

SUMMARY

Embodiment include systems, methods and apparatus to reduce the amount of nitrous oxide ($N_2O$) produced by a selective catalyst reductant (SCR) catalyst in an exhaust aftertreatment system. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
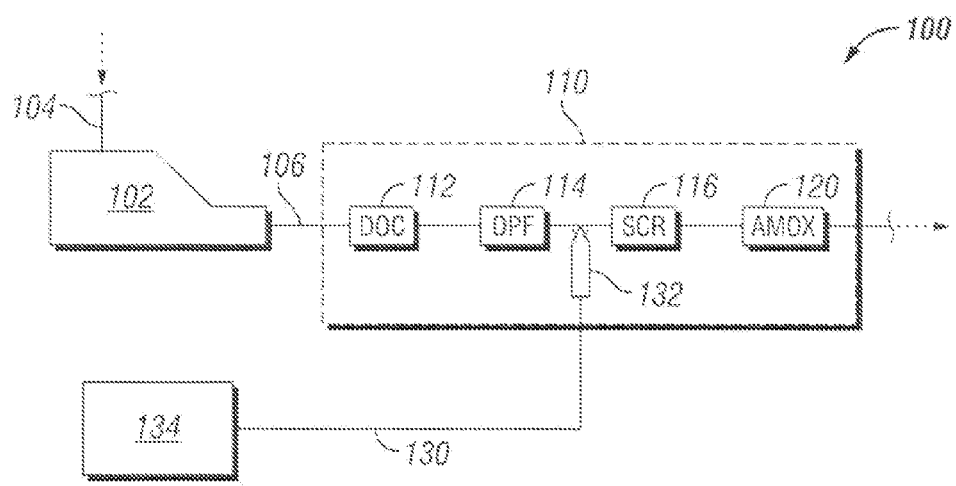
FIG. 1 is a schematic illustration of a system including an exemplary engine and exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a system 100 that includes an exhaust aftertreatment system 110. System 100 may be provided on a vehicle powered by an engine 102 such as a diesel engine, or on an engine 102 utilized in other applications such as power generation or pumping systems. Engine 102 includes an intake system 104 through which charge air enters and an exhaust system 106 through which exhaust gas resulting from combustion exits, it being understood that not all details of these systems that are typically present are shown. Before entering the atmosphere, however, the exhaust gas is treated by one or more aftertreatment devices in the exhaust aftertreatment system 110.

The exhaust system 106 includes the exhaust aftertreatment system 110 having one or more selective catalytic reduction (SCR) catalysts 116, and one or more locations for receiving a reductant from a reductant dosing system 130. The exhaust aftertreatment system 110 also includes one or more diesel oxidation catalysts (DOC) 112, and one or more diesel particulate filters (DPF) 114 upstream of SCR catalyst 116, and one or more ammonia oxidation (AMOX) catalysts 120 downstream of the SCR catalyst 116. In certain embodiments, one or more of the DOC 112, DPF 114, and AMOX 120 may not be present, may be located in different locations than what is shown in FIG. 1, and/or may be provided at multiple locations.

The system 100 further includes a reductant injector 132 operationally coupled to the exhaust conduit at a position upstream of the SCR catalyst 116 with its outlet, or nozzle, arranged to spray reductant into the exhaust system 106 where it mixes with engine exhaust gas produced by engine 102. SCR catalyst 116 promotes a chemical reaction between the reductant and $NO_x$ in the exhaust gas that converts substantial amounts of $NO_x$ to reduce $NO_x$ emissions before the exhaust gas passes into the atmosphere. The reductant injector 132 is fluidly coupled to a reductant source such as a reductant source 134, such as a storage tank for storing a liquid reductant or a housing for storing a dry reductant in a solid storage media that is released in gaseous form when heated. The reductant is any type of reductant utilized in an SCR aftertreatment system that results in ammonia being utilized as the final reductant—including at least ammonia (gaseous or aqueous) and urea.

The aftertreatment system 110 may include one or more other aftertreatment components not shown, such as an ammonia slip catalyst, and various temperature, pressure and exhaust gas constituent sensors. Exhaust system 106 may also include various components not shown, such an exhaust gas recirculation system, a turbocharger system, coolers, and other components connecting exhaust system 106 to intake system 104.

Figure 2:
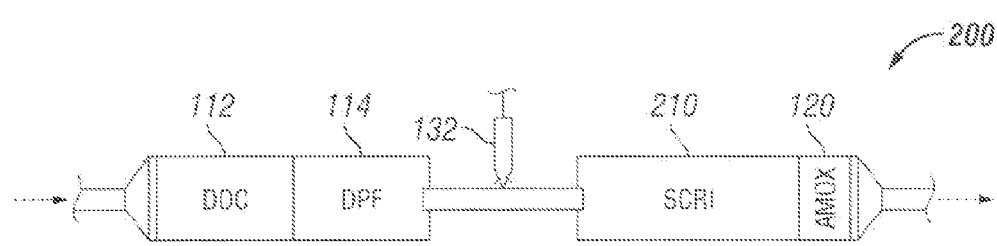
FIG. 2 is a schematic illustration of a traditional exhaust aftertreatment system with one SCR catalyst.

FIG. 2 illustrates an exhaust aftertreatment system 200 with a baseline SCR catalyst 210 in fluid communication with the exhaust gas in exhaust system 106 positioned downstream from the reductant injector 132. The baseline SCR catalyst 210 may include one or more SCR catalysts with a single washcoat comprising a single SCR catalyst formulation. When exhaust gas is exposed to a baseline SCR catalyst 210, the $NO_x$ in the exhaust gas reacts with the reductant introduced upstream to reduce the $NO_x$. A by-product of the reaction is that a small amount of nitrous oxide ($N_2O$) is produced.

The inventors have determined that the majority of $NO_x$ is reduced on the exhaust flow facing portion of the baseline SCR catalyst 210 and that $NO_x$ reduction exponentially decreases along the length of the baseline SCR catalyst 210. As a result, the majority of $NO_x$ reduction occurs on less than 50% of the baseline SCR catalyst 210 facing the exhaust flow, and most of the $N_2O$ is produced on less than 50% of the exhaust flow facing portion of the baseline SCR catalyst 210.

Figure 3:
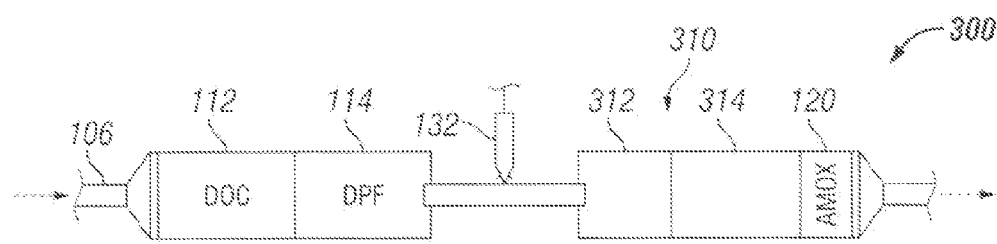
FIG. 3 is a schematic illustration of an exemplary exhaust aftertreatment system with two SCR catalysts, the second having replaced a portion of the first.

FIG. 3 illustrates an exemplary exhaust aftertreatment system 300 embodiment where SCR catalyst 310 is configured to minimize $N_2O$ formation by employing elements in the catalyst that make less $N_2O$ in or on the portion of the SCR catalyst that faces the exhaust gas flow. SCR catalyst 310 includes a first portion 312 extending from the inlet side of the SCR catalyst 310 to a second portion 314 that extends to the outlet side of the SCR catalyst 310. The first portion 312 extends less than 50% of the distance between the inlet of the SCR catalyst 310 and the outlet of the SCR catalyst 310. In certain embodiments, the first portion 312 and second portion 314 can each be separate SCR catalysts. SCR catalyst 310 further includes at least two SCR catalyst formulations applied to a substrate of the SCR catalyst 310 in one or more washcoats.

An exemplary embodiment of SCR catalyst 310 includes a first formulation and a second formulation, where the first formulation produces less $N_2O$ during the $NO_x$ reduction process than the second formulation when exposed to similar SCR conditions, and leads to the overall decrease in $N_2O$ and at the same time $NO_x$ reduction capability of SCR catalyst 310 is not substantially negatively affected.

In one exemplary embodiment, the first formulation may be applied to substantially coat the first portion 312 and the second formulation may be applied to substantially coat the second portion 314. In one embodiment, the first formulation has a low copper loading and the second formulation has a high copper loading. For example, the first formulation may include a copper-zeolite formulation with low copper loading and the second formulation may include a copper-zeolite formulation with high copper loading. In another embodiment, the first formulation has low copper loading including no copper loading, and the second formulation has a copper loading. For example, the first formulation may include a vanadium based catalyst or a hydrogen-zeolite formulation and the second formulation may include a copper based catalyst or copper-zeolite formulation. In still another embodiment, neither the first formulation nor the second formulation has a copper loading, but the first formulation is formulated as such to produce less $N_2O$ than the second formulation during the $NO_x$ reduction process. For example, the first formulation may include a vanadium based catalyst and the second formulation may include an iron-zeolite formulation. Another example being the first formulation including an iron-zeolite formulation and the second formulation including a vanadium based catalyst. It should be appreciated that other catalyst formulation combinations are contemplated.

It has been determined by the inventors that having a first formulation with a low copper loading on up to 50% of the SCR catalyst 310 with a second formulation with a high copper loading produces less $N_2O$ throughout the temperature testing rage of 100° C. to 600° C. than the baseline SCR catalyst 210. Further, it has also been determined a number of arrangements do not negatively affect $NO_x$ conversion, and at certain temperatures the SCR catalyst 310 converts more $NO_x$ than the baseline SCR catalyst 210 at higher temperatures, particularly temperatures exceeding 350° C.

Figure 4A:
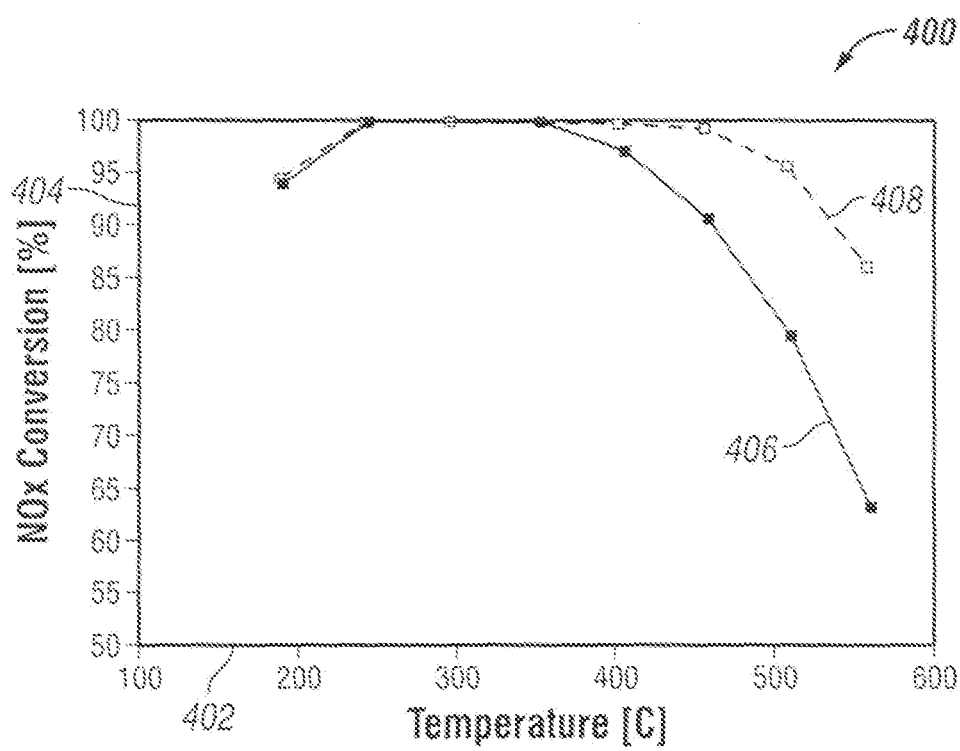
FIG. 4A-4B is a graph of test results of an exemplary exhaust aftertreatment system.
Figure 4B:
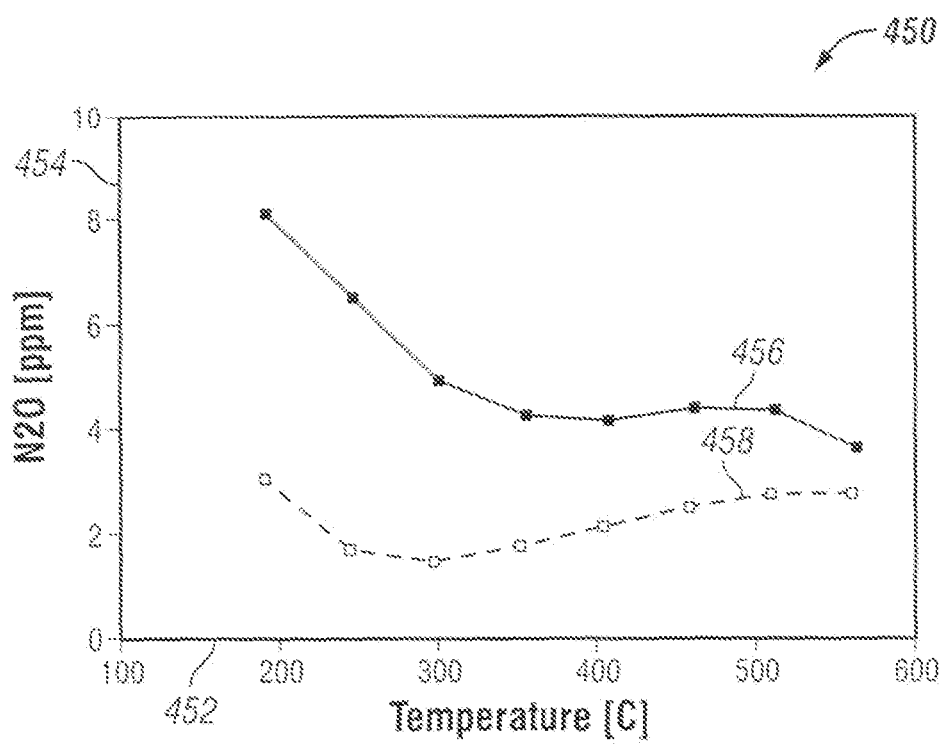

FIGS. 4A-4B illustrate graphs 400, 450 for SCR catalyst 310 referenced in FIG. 3 where the first portion 312 has a copper-zeolite catalyst formulation with a low copper loading and the second portion 314 has a copper-zeolite catalyst formulation with a high copper loading. Graph 400 of FIG. 4A includes a temperature in ° C. along an x-axis 402 and a $NO_x$ conversion percentage along a y-axis 404. Graph 400 further includes a baseline $NO_x$ conversion performance 406 of baseline SCR catalyst 210 and a $NO_x$ conversion performance 408 associated with SCR catalyst 310 under the same exhaust feed conditions of NO at 200 ppm, $NO_2/NO_x$ ratio of 0.5, $NH_3/NO_x$ ratio of 1, and space velocity of 40 $kh^{-1}$.

Graph 400 indicates $NO_x$ conversion is not substantially different between catalysts 210, 310 at temperatures below 350° C., and more NO is being converted at temperatures above 350° C. with SCR catalyst 310 than SCR catalyst 210. Graph 450 of FIG. 4B includes a temperature in ° C. along the x-axis 452 and a parts per million (PPM) of $N_2O$ produced along the y-axis 454. Graph 450 further includes a baseline $N_2O$ production 456 associated with baseline SCR catalyst 210 and an $N_2O$ production 458 for SCR catalyst 310. SCR catalyst 310 including with first portion 312 with a copper-zeolite catalyst formulation having a low copper loading and the second portion 314 with the copper-zeolite catalyst formulation with a high copper loading produces less, and in some embodiment, substantially less, $N_2O$ than SCR catalyst 210 under the same exhaust feed conditions.

Figure 5A:
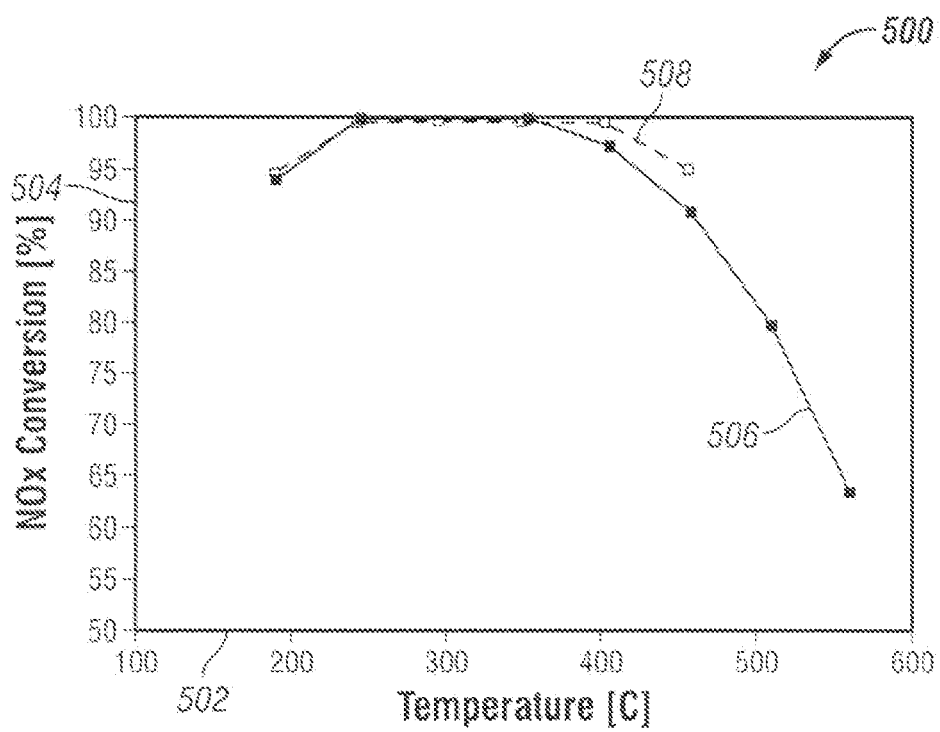
FIG. 5A-5B is a graph of test results of an exemplary exhaust aftertreatment system.
Figure 5B:
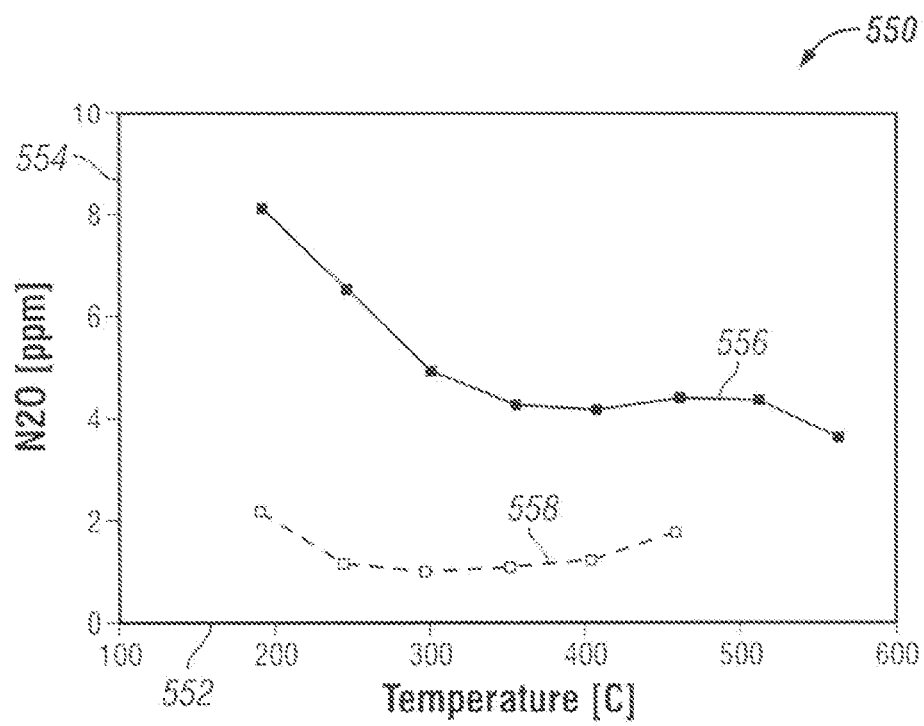

FIGS. 5A-5B illustrate graphs 500, 550 for a SCR catalyst 310 referenced in FIG. 3 where the first portion 312 has a vanadium based catalyst formulation and the second portion 314 has a copper-zeolite catalyst formulation. Graph 500 of FIG. 5A includes a temperature in ° C. along an x-axis 502 and a $NO_x$ conversion percentage along a y-axis 504. Graph 500 further includes a baseline $NO_x$ conversion performance 506 of SCR catalyst 210 and a $NO_x$ conversion performance 508 of SCR catalyst 310 having the above first and second formulations under the same exhaust gas feed conditions discussed with respect to FIGS. 4A-4B. SCR catalyst 310 and SCR catalyst 210 exhibit substantially the same $NO_x$ conversion performance at temperatures below 350° C., and more $NO_x$ is converted by SCR catalyst 310 at temperatures above 350° C.

Graph 550 of FIG. 5B includes a temperature in ° C. along the x-axis 552 and a parts per million (PPM) of $N_2O$ produced along the y-axis 554. Graph 550 further includes a baseline $N_2O$ production 556 associated with baseline SCR catalyst 210 and an $N_2O$ production 558 for SCR catalyst 310. SCR catalyst 310 including the first portion 312 having a vanadium based catalyst formulation and the second portion 314 having a copper-zeolite catalyst formulation produces less $N_2O$ than SCR catalyst 210 under the same exhaust feed conditions.

Figure 6A:
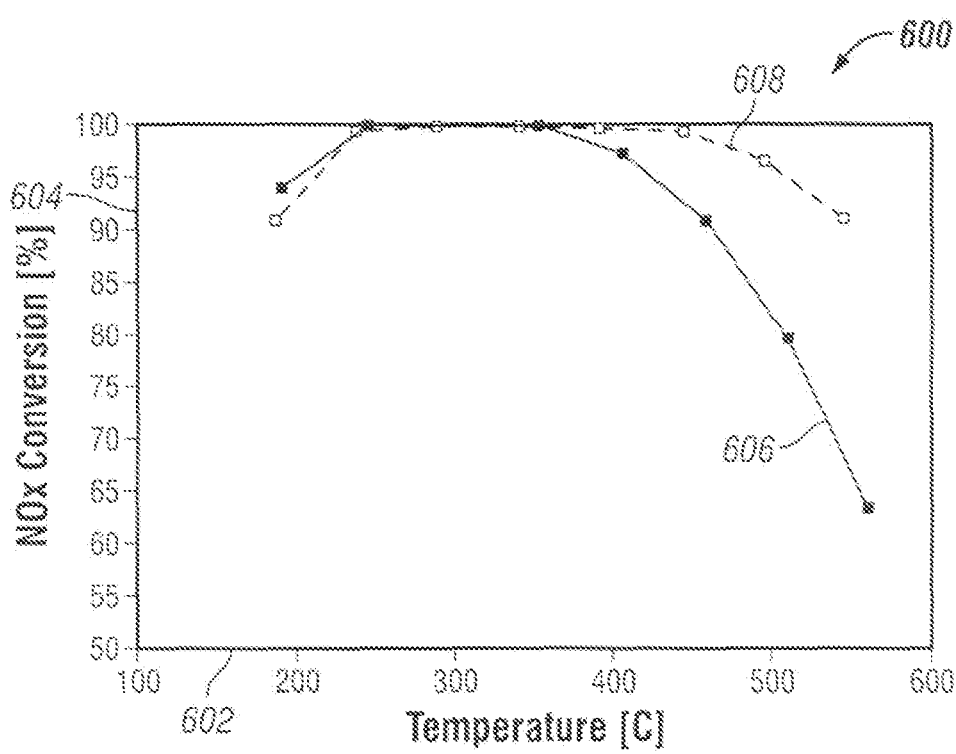
FIG. 6A-6B is a graph of test results of an exemplary exhaust aftertreatment system.
Figure 6B:
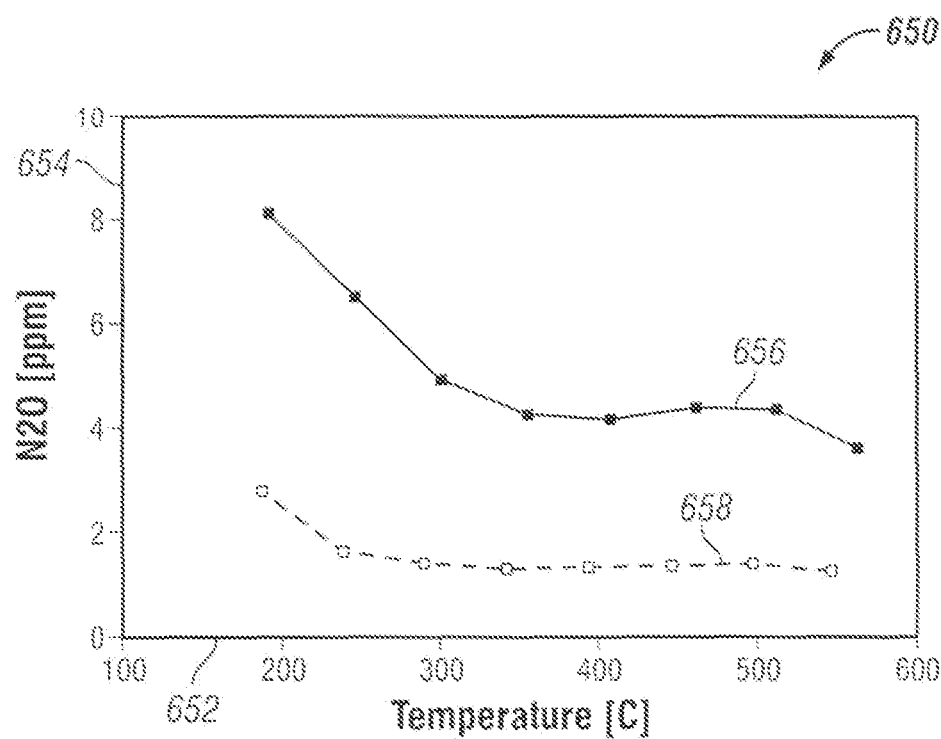

FIGS. 6A-6B illustrate graphs 600, 650 for SCR catalyst 310 referenced in FIG. 3 where the first portion 312 has a hydrogen-zeolite catalyst formulation and the second portion 314 has a copper based catalyst formulation. Graph 600 of FIG. 6A includes a temperature in ° C. along an x-axis 602 and a $NO_x$ conversion percentage along a y-axis 604. Graph 600 further includes a baseline $NO_x$ conversion performance 606 of SCR catalyst 210 and a $NO_x$ conversion performance 608 of SCR catalyst 310 having the above first and second formulations under the same exhaust gas feed conditions discussed with respect to FIGS. 4A-4B. SCR catalyst 310 and SCR catalyst 210 exhibit substantially the same $NO_x$ conversion performance at temperatures below 350° C., and more $NO_x$ is converted by SCR catalyst 310 at temperatures above 350° C.

Graph 650 of FIG. 6B includes a temperature in ° C. along the x-axis 652 and a parts per million (PPM) of $N_2O$ produced along the y-axis 554. Graph 650 further includes a baseline $N_2O$ production 656 associated with baseline SCR catalyst 210 and an $N_2O$ production 658 for SCR catalyst 310. SCR catalyst 310 including the first portion 312 with a hydrogen-zeolite catalyst formulation and the second portion 314 with a copper based catalyst formulation produces less $N_2O$ than SCR catalyst 210 under the same exhaust feed conditions.

Referring back to the SCR catalyst 310 illustrated in FIG. 3, another exemplary embodiment of the SCR catalyst 310 includes a first layer formulation and a second layer formulation. The first layer formulation is applied to the SCR catalyst 310 via a washcoat to substantially coat the first portion 312 and the second portion 314. The second layer formulation is applied via a washcoat to substantially coat the first layer formulation washcoat on SCR catalyst 310. It is contemplated that the second layer formulation washcoat may only be applied to the first portion 312 in certain embodiments. The second layer formulation is formulated to produce less $N_2O$ during the $NO_x$ reduction process than the first layer formulation while not substantially reducing the effectiveness of the $NO_x$ reduction process. At high temperatures, the catalyst is diffusion limited at the first surface the reductant infused exhaust gas encounters when contacting SCR catalyst 310, resulting in a catalytic reaction at the second layer formulation washcoat before the reductant infused exhaust gas permeates the second layer formulation washcoat to the first layer formulation washcoat.

In one embodiment, the first layer formulation has a high copper loading and the second layer formulation has a low copper loading. For example, the first layer formulation may include a copper-zeolite formulation with high copper loading and the second layer formulation may include a copper-zeolite formulation with low copper loading. In another embodiment, the first layer formulation has a copper loading and the second layer formulation has no copper loading. For example, the first layer formulation may include a copper-zeolite formulation and the second layer formulation may include a vanadium based formulation. In still another embodiment, neither the first layer formulation nor the second layer formulation has a copper loading, but where the second layer formulation is formulated as such to produce less $N_2O$ than the first layer formulation during the $NO_x$ reduction process. For example, the second layer formulation may include a vanadium based catalyst and the first layer formulation may include an iron-zeolite formulation. In another example, the second layer formulation includes an iron-zeolite formulation and the first layer formulation includes a vanadium based catalyst. It should be appreciated that other catalyst layer formulation combinations are contemplated.

Another exemplary embodiment of the SCR catalyst 310 includes a washcoat having an intermixed catalyst formulation including at least two catalyst formulations where at least one catalyst formulation is a low $N_2O$ producing catalyst formulation in relation to the other catalyst formulations comprising the intermixed catalyst formulation. One embodiment includes a first catalyst formulation and a second catalyst formulation, where the first catalyst formulation is a low $N_2O$ producing catalyst formulation during the $NO_x$ reduction process and the second catalyst formulation is a formulation that produces a higher amount of $N_2O$ during the $NO_x$ reduction process than the first catalyst formulation. The intermixed catalyst formulation results in a diluted washcoat to produce less $N_2O$ than the baseline SCR catalyst 210 referenced in FIG. 2, while also formulated to substantially reduce $NO_x$ in the $NO_x$ reduction process.

In one embodiment, the first catalyst formulation has a low copper loading and the second catalyst formulation has a high copper loading. For example, the first catalyst formulation may include a copper-zeolite formulation with low copper loading and the second catalyst formulation may include a copper-zeolite formulation with high copper loading. In another embodiment, the first catalyst formulation has no copper loading and the second catalyst formulation has a copper loading. For example, the first catalyst formulation may include a vanadium based catalyst and the second catalyst formulation may include a copper-zeolite formulation. In still another embodiment, neither the first formulation nor the second formulation has a copper loading, but the first formulation is formulated as such to produce less $N_2O$ than the second formulation during the $NO_x$ reduction process. For example, the first formulation may include a vanadium based catalyst and the second formulation may include an iron-zeolite catalyst. In a further embodiment, the intermixed catalyst formulation includes a third catalyst formulation. An example intermixed catalyst formulation having three catalyst formulations may include a vanadium based catalyst, an iron-zeolite catalyst, and a copper zeolite catalyst. It should be appreciated that other catalyst formulation combinations are contemplated, so long as at least one catalyst formulation is a low $N_2O$ producing catalyst formulation in relation to the other catalyst formulations comprising the intermixed catalyst formulation.

Various aspects of the systems, apparatus, and methods are disclosed herein. For example, one aspect involves a system that includes an internal combustion engine having an exhaust aftertreatment system for receiving an exhaust gas produced from operation of the internal combustion engine, a reductant system including a reductant source, and a diesel exhaust aftertreatment system that includes at least one selective catalytic reduction (SCR) catalyst positioned downstream of a connection of the reductant source to the exhaust aftertreatment system. The at least one SCR catalyst includes at least two formulations on portions of the SCR catalyst, the at least two formulations including a first formulation and a second formulation. The first formulation produces less $N_2O$ during $NO_x$ reduction by the SCR catalyst than the second formulation.

In one embodiment of the system, a first portion of the SCR catalyst with the first formulation is located upstream of a second portion of the SCR catalyst with the second formulation. In one refinement of the system, the first and second portions of the SCR catalyst comprise one of separate SCR catalysts or portions of a same SCR catalyst. In another refinement of the system, the first formulation comprises at least one of: a vanadium-based SCR catalyst, an iron-zeolite based SCR catalyst, a hydrogen-zeolite based SCR catalyst, a low copper loading copper-zeolite SCR catalyst, and a low copper loading copper-zeolite formulation. The second formulation comprises at least one of: a copper-zeolite SCR catalyst, an iron-zeolite SCR catalyst; a vanadium-based SCR catalyst, a copper-based SCR catalyst, and a high copper loading copper-zeolite formulation. In a further embodiment of the system, the SCR catalyst includes a length from an upstream end to a downstream end and the first portion of the SCR catalyst extends along less than half of the length.

In another embodiment of the system, the first formulation includes a low copper loading washcoat applied to at least a first portion of the SCR catalyst and the second loading configuration includes a high copper loading washcoat applied to at least a second portion of the SCR catalyst. The first portion is upstream of the second portion. In one refinement of the system, the high copper loading washcoat substantially coats the first and second portions of the SCR catalyst and the low copper loading washcoat coats the high copper loading washcoat on at least the first portion of the SCR catalyst. In another refinement of the system, the low copper loading washcoat is intermixed with the high copper loading washcoat to form at least one washcoat applied to the SCR catalyst.

In another aspect, an apparatus for reducing constituents in an exhaust gas includes at least one selective catalytic reduction (SCR) catalyst including a first portion with a first formulation and a second portion with a second formulation. The first formulation produces a lesser amount of $N_2O$ during $NO_x$ reduction of the exhaust gas than the second formulation. The first portion is positioned upstream of the second portion so the first portion first receives the exhaust gas. In one embodiment of the apparatus, the at least one SCR catalyst includes a length and the first portion extends along less than one half of the length. In another embodiment of the apparatus, the first and second portions are separate first and second SCR catalysts.

In one refinement of the apparatus, the first formulation of the first SCR catalyst is a low copper loading copper-zeolite catalyst formulation and the second formulation of the second SCR catalyst is a high copper loading copper-zeolite catalyst formulation. In another refinement of the apparatus, the first formulation of the first SCR catalyst is a vanadium based catalyst formulation and the second formulation of the second SCR catalyst is a high copper loading copper-zeolite catalyst formulation. In still another refinement of the apparatus, the first formulation of the first SCR catalyst is a hydrogen-zeolite catalyst formulation and the second formulation of the second SCR catalyst is a copper based formulation.

In another aspect, an apparatus for reducing constituents in an exhaust gas includes a selective catalytic reduction (SCR) catalyst including a top washcoat and a bottom washcoat. The bottom washcoat includes a high copper loading SCR catalyst formulation and the top washcoat includes a low copper loading SCR catalyst formulation and substantially coats the first washcoat. In one embodiment of the apparatus, the bottom washcoat is a copper-zeolite based SCR catalyst formulation with a high copper loading and the top washcoat is a copper-zeolite based SCR catalyst formulation with a low copper loading. In another embodiment of the apparatus, the bottom washcoat includes a copper-zeolite based SCR catalyst formulation and the top washcoat includes a vanadium based SCR catalyst formulation. In still another embodiment of the apparatus, the bottom washcoat includes an iron-zeolite based SCR catalyst formulation and the top washcoat includes a vanadium based SCR catalyst formulation. In yet another embodiment of the apparatus, the bottom washcoat is a vanadium based SCR catalyst formulation and the top washcoat is an iron-zeolite based SCR catalyst formulation.

In another aspect, an apparatus for reducing constituents in an exhaust gas includes a selective catalytic reduction (SCR) catalyst including a first catalyst formulation and a second catalyst formulation. The first catalyst formulation includes a lower copper loading than the second catalyst formulation, the first catalyst formulation being intermixed with the second catalyst formulation to form a mixed catalyst formulation washcoat and the mixed catalyst formulation washcoat substantially coats the SCR catalyst.

In one embodiment of the apparatus, the first catalyst formulation is a copper-zeolite based formulation with a low copper loading and the second catalyst formulation is a copper-zeolite based formulation with a high copper loading. In another embodiment of the apparatus, the first catalyst formulation is a vanadium based formulation and the second catalyst formulation is a copper-zeolite formulation. In still another embodiment of the apparatus, the first catalyst formulation is a vanadium based formulation and the second catalyst formulation is an iron-zeolite formulation.

In yet another embodiment of the apparatus, the apparatus further includes a third catalyst formulation where the first catalyst formulation is a vanadium based formulation, the second catalyst formulation is an copper-zeolite formulation, and the third catalyst formulation is an iron-zeolite formulation In another aspect, a method for treating an exhaust gas includes exposing the exhaust gas to a selective catalytic reduction (SCR) catalyst including first catalyst formulation and a second catalyst formulation. The first catalyst formulation produces less $N_2O$ during NOx reduction by the SCR catalyst than the second formulation. In one embodiment of the method, exposing the exhaust gas to the first and second catalyst formulations of the SCR catalyst results at high exhaust gas temperatures results in a decrease in $N_2O$ formation over an SCR catalyst including the second catalyst formulation along. In one refinement of the method, the high exhaust gas temperature is 350° C. or more.

In another embodiment of the method, the first catalyst formulation includes a low copper loading that is less than 75% copper and the second catalyst formulation includes a high copper loading that is more than 75% copper. In still another embodiment of the method, the first catalyst formulation includes a low copper loading that is less than 50% copper and the second catalyst formulation includes a high copper loading that is more than 50% copper. In yet another embodiment of the method, the first catalyst formulation includes a low copper loading that is less than 25% copper and the second catalyst formulation includes a high copper loading that is more than 25% copper. In yet still another embodiment of the method, the first catalyst formulation includes a low copper loading that is less than 10% copper and the second catalyst formulation includes a high copper loading that is more than 10% copper. In further still another embodiment of the method, the first catalyst formulation includes no copper and the second catalyst formulation includes copper.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine having an exhaust aftertreatment system for receiving an exhaust gas produced from operation of the internal combustion engine; a reductant system including a reductant source; and
a diesel exhaust aftertreatment system that includes at least one selective catalytic reduction (SCR) catalyst positioned downstream of a connection of the reductant source to the exhaust aftertreatment system, wherein the at least one SCR catalyst includes at least three formulations on portions of the SCR catalyst, the at least three formulations including a first formulation, a second formulation, and a third formulation, wherein the first formulation produces less $N_2O$ during $NO_x$ reduction by the SCR catalyst than the second formulation, wherein:
the first formulation is a vanadium based catalyst formulation, the second formulation is a copper-zeolite catalyst formulation, and the third formulation is an iron-zeolite catalyst formulation, and
a first portion of the SCR catalyst with the first formulation is located upstream of a second portion of the SCR catalyst with the second formulation.

2. The system of claim 1, wherein the first and second portions of the SCR catalyst comprise one of separate SCR catalysts or portions of a same SCR catalyst.

3. The system of claim 1, wherein the SCR catalyst includes a length from an upstream end to a downstream end, and the first portion of the SCR catalyst extends along less than half of the length.

4. A system, comprising:
an internal combustion engine having an exhaust aftertreatment system for receiving an exhaust gas produced from operation of the internal combustion engine; a reductant system including a reductant source; and
a diesel exhaust aftertreatment system that includes at least one selective catalytic reduction (SCR) catalyst positioned downstream of a connection of the reductant source to the exhaust aftertreatment system, wherein the at least one SCR catalyst includes at least three formulations on portions of the SCR catalyst, the at least three formulations including a first formulation, a second formulation, and a third formulation, wherein the first formulation produces less $N_2O$ during $NO_x$ reduction by the SCR catalyst than the second formulation, wherein:
the first formulation is a vanadium based catalyst formulation, the second formulation is a copper-zeolite catalyst formulation, and the third formulation is an iron-zeolite catalyst formulation, wherein the first formulation includes a low copper loading washcoat applied to at least a first portion of the SCR catalyst and the second formulation includes a high copper loading washcoat applied to at least a second portion of the SCR catalyst, wherein the first portion is upstream of the second portion.

5. The system of claim 4, wherein:
the high copper loading washcoat substantially coats the first and second portions of the SCR catalyst; and
the low copper loading washcoat coats the high copper loading washcoat on at least the first portion of the SCR catalyst.

6. The system of claim 4, wherein the low copper loading washcoat is intermixed with the high copper loading washcoat to form at least one washcoat applied to the SCR catalyst.

7. An apparatus for reducing constituents in an exhaust gas, comprising:
at least one selective catalytic reduction (SCR) catalyst including a first portion with a first formulation and a second portion with a second formulation, wherein the first formulation produces a lesser amount of $N_2O$ during $NO_x$ reduction of the exhaust gas than the second formulation, wherein the first portion is positioned upstream of the second portion so the first portion first receives the exhaust gas, and further comprising a third formulation on the SCR catalyst, wherein:
the first formulation is a vanadium based catalyst formulation;
the second formulation is a copper-zeolite catalyst formulation; and
the third formulation is an iron-zeolite catalyst formulation.

8. The apparatus of claim 7, wherein the at least one SCR catalyst includes a length and the first portion extends along less than one half of the length.

9. The apparatus of claim 7, wherein the first and second portions are separate first and second SCR catalysts.

10. The apparatus of claim 7, wherein the second formulation is a high copper loading copper-zeolite catalyst formulation.

11. An apparatus for reducing constituents in an exhaust gas, comprising:
a selective catalytic reduction (SCR) catalyst including a top washcoat and a bottom washcoat, wherein:
the bottom washcoat includes a high copper loading SCR catalyst formulation;
the top washcoat includes a low copper loading SCR catalyst formulation and substantially coats the bottom washcoat;
further comprising a third catalyst formulation on the SCR catalyst, wherein:
the top washcoat includes a vanadium based catalyst formulation;
the bottom washcoat is a copper-zeolite catalyst formulation; and
the third catalyst formulation is an iron-zeolite catalyst formulation.

12. The apparatus of claim 11, wherein:
the copper-zeolite catalyst formulation includes a high copper loading; and
the top washcoat includes a low copper loading.

13. A method for treating an exhaust gas, comprising:
exposing the exhaust gas to a selective catalytic reduction (SCR) catalyst including first catalyst formulation and a second catalyst formulation;
wherein the first catalyst formulation produces less $N_2O$ during $NO_x$ reduction by the SCR catalyst than the second formulation, and further comprising a third catalyst formulation on the SCR catalyst, wherein:
the first catalyst formulation is a vanadium based formulation;
the second catalyst formulation is a copper-zeolite formulation; and the third catalyst formulation is an iron-zeolite formulation, wherein exposing the exhaust gas to the first and second catalyst formulations of the SCR catalyst results at high exhaust gas temperatures results in a decrease in $N_2O$ formation over an SCR catalyst including the second catalyst formulation alone.

14. The method of claim 13, wherein the high exhaust gas temperature is 350° C. or more.

15. A method for treating an exhaust gas, comprising:
exposing the exhaust gas to a selective catalytic reduction (SCR) catalyst including first catalyst formulation and a second catalyst formulation;
wherein the first catalyst formulation produces less $N_2O$ during $NO_x$ reduction by the SCR catalyst than the second formulation, and further comprising a third catalyst formulation on the SCR catalyst, wherein:
the first catalyst formulation is a vanadium based formulation;
the second catalyst formulation is a copper-zeolite formulation;
the third catalyst formulation is an iron-zeolite formulation;
the first catalyst formulation includes a low copper loading that is less than 75% copper; and
the second catalyst formulation includes a high copper loading that is more than 75% copper.

16. The method of claim 13, wherein the first catalyst formulation includes a low copper loading that is less than 50% copper and the second catalyst formulation includes a high copper loading that is more than 50% copper.

17. The method of claim 13, wherein the first catalyst formulation includes a low copper loading that is less than 25% copper and the second catalyst formulation includes a high copper loading that is more than 25% copper.

18. A method for treating an exhaust gas, comprising:
exposing the exhaust gas to a selective catalytic reduction (SCR) catalyst including first catalyst formulation and a second catalyst formulation;
wherein the first catalyst formulation produces less $N_2O$ during $NO_x$ reduction by the SCR catalyst than the second formulation, and further comprising a third catalyst formulation on the SCR catalyst, wherein:
the first catalyst formulation is a vanadium based formulation;
the second catalyst formulation is a copper-zeolite formulation;
the third catalyst formulation is an iron-zeolite formulation;
the selective catalytic reduction (SCR) catalyst includes a first portion with the first formulation and a second portion with the second formulation;
the first portion is positioned upstream of the second portion so the first portion first receives the exhaust gas.

19. A system, comprising:
an internal combustion engine having an exhaust aftertreatment system for receiving an exhaust gas produced from operation of the internal combustion engine; a reductant system including a reductant source; and
a diesel exhaust aftertreatment system that includes at least one selective catalytic reduction (SCR) catalyst positioned downstream of a connection of the reductant source to the exhaust aftertreatment system,
the selective catalytic reduction (SCR) catalyst including a top washcoat and a bottom washcoat, wherein:
the bottom washcoat includes a high copper loading SCR catalyst formulation;
the top washcoat includes a low copper loading SCR catalyst formulation and substantially coats the bottom washcoat;
further comprising a third catalyst formulation on the SCR catalyst, wherein;
the top washcoat includes a vanadium based catalyst formulation;
the bottom washcoat is a copper-zeolite catalyst formulation; and
the third catalyst formulation is an iron-zeolite catalyst formulation.

20. A method for treating an exhaust gas, comprising:
exposing the exhaust gas to a selective catalytic reduction (SCR) catalyst, the selective catalytic reduction (SCR) catalyst including a top washcoat and a bottom washcoat, and further comprising a third catalyst formulation on the SCR catalyst, wherein:
the bottom washcoat includes a high copper loading SCR catalyst formulation;
the top washcoat includes a low copper loading SCR catalyst formulation and substantially coats the bottom washcoat;
the top washcoat includes a vanadium based catalyst formulation;
the bottom washcoat is a copper-zeolite catalyst formulation; and
the third catalyst formulation is an iron-zeolite catalyst formulation.

* * * * *